US007791299B2

(12) United States Patent
Eichin

(10) Patent No.: US 7,791,299 B2
(45) Date of Patent: Sep. 7, 2010

(54) PROCESS FOR CONTROLLING AN ELECTRICALLY DRIVEN MOTOR VEHICLE WINDOW

(75) Inventor: Matthias Eichin, Heilbronn (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 1232 days.

(21) Appl. No.: 11/104,600

(22) Filed: Apr. 13, 2005

(65) Prior Publication Data

US 2005/0229498 A1 Oct. 20, 2005

(30) Foreign Application Priority Data

Apr. 16, 2004 (DE) ....................... 10 2004 018 611

(51) Int. Cl.
*G05D 3/00* (2006.01)

(52) U.S. Cl. ......................... 318/469; 318/465; 318/477

(58) Field of Classification Search ................. 318/469, 318/465, 477
See application file for complete search history.

(56) References Cited

U.S. PATENT DOCUMENTS

| | | | | |
|---|---|---|---|---|
| 5,682,090 | A | 10/1997 | Shigematsu | |
| 6,114,822 | A * | 9/2000 | Ubelein et al. | 318/469 |
| 6,236,176 | B1 * | 5/2001 | Uebelein et al. | 318/287 |
| 6,677,720 | B2 * | 1/2004 | Fraser | 318/445 |
| 6,943,516 | B2 * | 9/2005 | Woller et al. | 318/466 |
| 6,952,087 | B2 * | 10/2005 | Lamm | 318/283 |

* cited by examiner

*Primary Examiner*—Patrick J Assouad
*Assistant Examiner*—Renata McCloud
(74) *Attorney, Agent, or Firm*—Laurence A. Greenberg; Werner H. Stemer; Ralph E. Locher

(57) ABSTRACT

A process for controlling an electrically driven window pane for a motor vehicle which has an operating element for triggering the pane motion. After the operation of the operating element, the window pane is moved by a driving motor until a soft-stop position is reached, the motion of the driving motor being detected for determining the window pane position. A multiple operation of the operating element within a definable time period causes an overshooting of the soft-stop position to the mechanical stop, in which the position of the pane is newly defined.

8 Claims, 1 Drawing Sheet

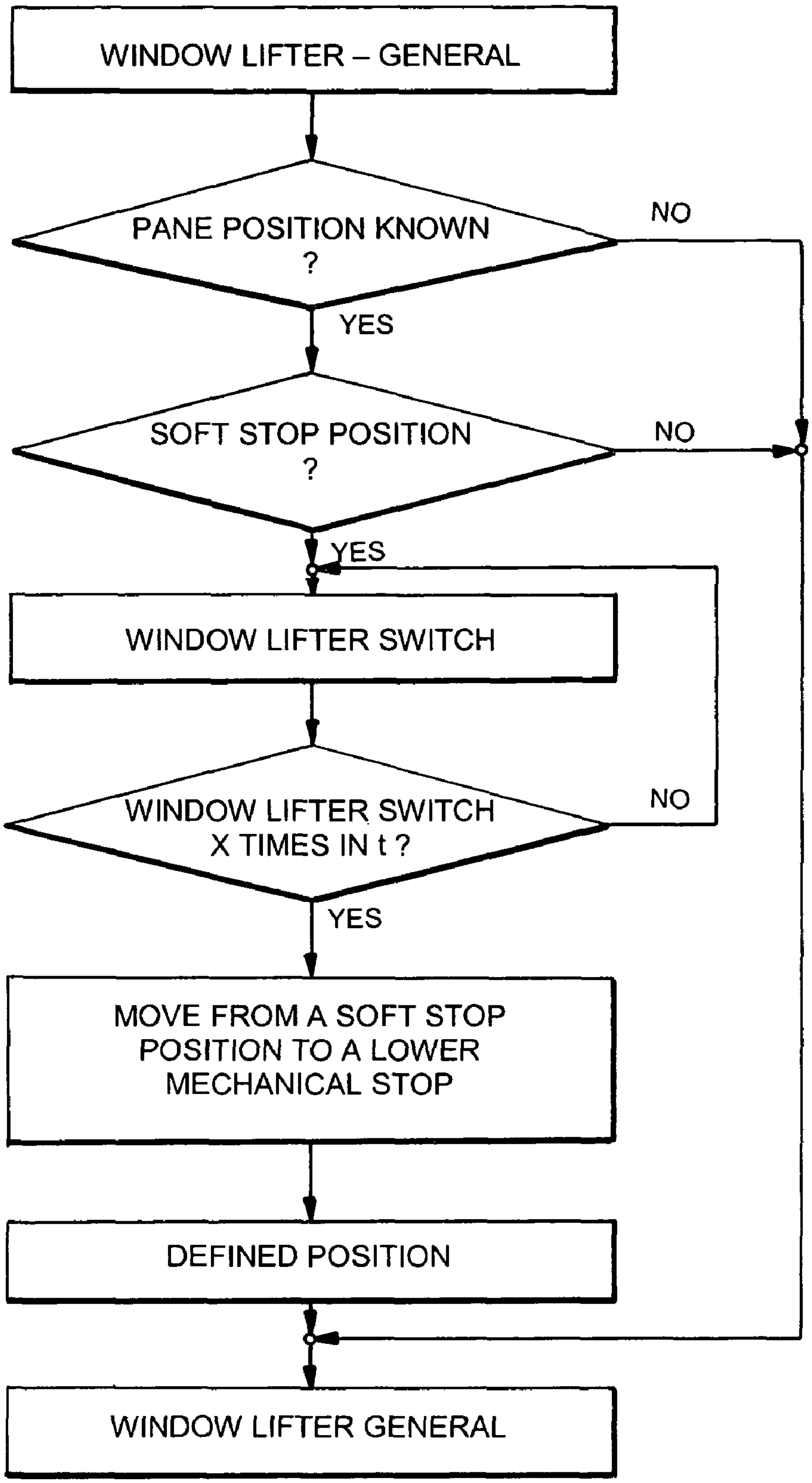
WINDOW LIFTER – GENERAL
PANE POSITION KNOWN ?
NO
YES
SOFT STOP POSITION ?
NO
YES
WINDOW LIFTER SWITCH
WINDOW LIFTER SWITCH X TIMES IN t ?
NO
YES
MOVE FROM A SOFT STOP POSITION TO A LOWER MECHANICAL STOP
DEFINED POSITION
WINDOW LIFTER GENERAL

PROCESS FOR CONTROLLING AN ELECTRICALLY DRIVEN MOTOR VEHICLE WINDOW

This application claims the priority of German application no. 10 2004 018 611.1, filed Apr. 16, 2004, the disclosure of which is expressly incorporated by reference herein.

BACKGROUND AND SUMMARY OF THE INVENTION

The invention relates to a process for controlling a window with an electric window lifter for a motor vehicle, as known from German Patent Document DE 44 12 028 A1.

In the case of this known process for controlling a window pane with an electric window lifter drive for a motor vehicle, a so-called squeeze-in protection is implemented so that, when the window pane is closed, an obstacle causes a stopping of the motion of the window pane and possibly a moving-back of the window pane. As a result, no accidental squeezing-in will occur. In order to determine the position of the window pane in the case of this known process, the pulses of a d.c. driving motor moving the window pane are detected during the rotation of the motor, and the actual window pane position is determined on the basis of the counted pulses. When the window pane is lifted to the upper edge of the window or is lowered to the lower edge of the window, thus moves into its final stop position, the latter is detected by a microswitch, and the pulse counter is automatically set to 0 or to a previously defined value.

According to the present invention, when controlling window panes with a squeeze-in protection, on the one hand, it is ensured that the movement of the window pane is stopped in the event of an obstacle but that, on the other hand, in the event of a sluggishness of the pane, for example, in cold temperatures or when the pane seal is deformed, an obstacle is not erroneously detected and the movement of the window pane is stopped and/or vice-versa. In the case of sluggishness, the window pane should move over this sluggish point by means of a corresponding driving force. This driving force results in a hard movement of the window pane into its “pane closed” or “pane open” end positions.

In order to avoid that, preferably during the lowering, the window pane will not move unnecessarily hard against a final stop, a soft-stop position is defined. The movement of the window is stopped by the switching-off of the window lifter motor during the lowering of the window before the final stop has been reached, the so-called soft-stop position. The pane can thereby be stopped in a noiseless manner and the mechanical stress is reduced. Furthermore, by providing an overshoot logic, the advantage is achieved that the pane position can also be newly adapted in its end positions in order to, for example, be able to react to faulty transmissions of Hall pulses or a hardware and/or software fault. The overshoot logic can advantageously be generated by the driver himself by a repeated operating of the operating switch for the window pane.

Other objects, advantages and novel features of the present invention will become apparent from the following detailed description of the invention when considered in conjunction with the accompanying drawings.

BRIEF DESCRIPTION OF THE DRAWING

The single FIGURE is a basic overview of the process according to the invention.

DETAILED DESCRIPTION OF THE DRAWING

As illustrated in the FIGURE, a window lifter switch is operated in a first operating step 10. Here, the controlling of the motion of the window pane can take place by means of the operating button in the cockpit of the vehicle as well as, for example, by a remote control on the ignition key. For the purpose of clarification, in operating step 10, the operating element is therefore called “FH (window lifter) general”. After the operation of the window lifter in operating step 10, it is checked in a query 11 whether the position of the window pane is known, thus, whether the position of the pane has been learned. If the pane position is known, it is checked in a subsequent step 12 whether the pane is in its soft-stop position. After this software-side checking of the position of the window pane and the detection of the soft-stop position, the window lifter switch (FH switch) in the vehicle is monitored with respect to a possible operation. After the lowering of the pane in step 13A, the control unit monitors whether the window lifter switch (FH-switch) is operated additional times within a definable time period. Thus, for example, when the driver determines that the window pane was not completely lowered, he can cause an overshooting of the soft-stop function of the pane by a multiple operation of the window lifter switch (FH-switch). For this purpose, process step 13B monitors whether the window lifter switch was operated, for example, at least 3 times during a second. If this is so, in operating step 14, the window pane moves beyond the soft-stop position to a lower mechanical stop.

Thus, in operating step 15, the window pane has a defined position, and the known position of the window pane present in the control unit can be rejected. On the basis of the position of the window pane defined by the mechanical stop, the defined position is newly set in the control unit. The internal counter for detecting the position of the window lifter pane is, for example, reset. Finally, in operating step 16, a new operation of the operating element (FH general) takes place again, whereby the process returns to the start.

In the process, the NO output of the query 11, whether the window pane position is known in the control unit, and of the query 12, whether the window pane is in the soft-stop position, leads to the end of the process in which the driver controls the pane by means of the operating element (FH general) for a motion of the window pane.

The NO output of query 13B, which leads back to step 13A, has the result that the window lifter switch during the soft-stop position of the window pane is monitored with respect to a definable number of operations within a definable time. Thus, it becomes possible to move a pane, which has been opened for some time, in a very targeted manner into a defined position.

The soft-stop function of the motion of a window pane in a motor vehicle in the present example relates only to the lowering in order to thus switch off the window lifter motor early and prevent the motion of the pane to the lower stop.

The possibility of overshooting the soft-stop position, which is initiated by the user himself, has the advantage that the position of the pane, which is defined by the lower mechanical end stops, can be entered, for example, for mounting purposes on door seals.

Furthermore, because of the taking-up of a defined position, the pane position can be newly learned if, for example, a hardware or software failure results in the pane position being incorrectly detected. In this case, a pane could, for example, be considered as opened although it is still closed. It is now possible for the driver to move the pane into its final position by initiating the overshoot logic and thus permit a new learning of the position of the window pane.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for controlling an electrically driven window pane for a motor vehicle having a switch for triggering motion of the window pane, and having a driving motor for moving the window pane, comprising:

detecting the motion of the driving motor or the window pane;

determining if movement of the window pane has stopped at a defined soft-stop position of the window pane before an end stop has been reached;

overshooting the soft-stop position, after the switch has been operated a predetermined plurality of times within a predetermined time period, to move the window pane to a final stop; and detecting the final stop as a defined position of the window pane.

2. Process according to claim 1, wherein the predetermined plurality of times within the predetermined time period is three times per second.

3. Process according to claim 1, further comprising:

monitoring operation of the switch when said motor has stopped before reaching said end point;

initiating movement of the window pane if a human operates the switch the predetermined plurality of times within the predetermined time period.

4. The process according to claim 3, further comprising the step of detecting said final stop of said window after said initiating step and assigning said final stop as a defined position of said window.

5. Process according to claim 3, wherein the predetermined plurality of times within the predetermined time period is three times per second.

6. Process according to claim 4, wherein the predetermined plurality of times within the predetermined time period is three times per second.

7. Process according to claim 1, wherein the soft-stop position is a defined position.

8. Process according to claim 1, wherein the switch is operated via a button in a cockpit of the motor vehicle.

* * * * *